Sept. 21, 1943.　　　D. B. TOLLEY　　　2,329,865
LATCHING PAN FOR TANKS
Filed Nov. 21, 1941

INVENTOR.
DONALD B. TOLLEY.
BY Lockwood, Goldsmith & Galt,
ATTORNEYS.

Patented Sept. 21, 1943

2,329,865

UNITED STATES PATENT OFFICE 2,329,865

LATCHING PAN FOR TANKS

Donald B. Tolley, Macomb, Ill., assignor to Globe American Corporation, Kokomo, Ind., a corporation Application November 21, 1941, Serial No. 419,825

3 Claims. (Cl. 119—77)

This invention relates to a pan and latch structure provided for centering the pan and removably latching it to a tank such as a chick fount or watering tank.

In the application of the invention herein disclosed, it is applied to a chick fount wherein a water or liquid containing tank is associated with a pan or trough open at the top for permitting access to the water or liquid by fowls or the like, and wherein the top of the tank when in use is sealed with openings provided near the bottom thereof at a predetermined level with respect to the pan for maintaining a liquid level therein.

This invention relates to the structure and latching device of the pan wherein it may be readily latched to the bottom of the tank and readily removed therefrom. This arrangement is such that the tank with the pan attached may be carried by a bail at the top from one location to another and may be hung suspended by the bail at the top of the tank with the pan in latched association therewith.

The invention is more specifically directed to the provision on the pan of a centering well in which the tank is centered and seated for latching engagement associated with a latching device acting to cooperate with the pan and tank to automatically latch them together when in tank seated relation while permitting convenient manual release thereof, and wherein the pan is provided with a recessed portion to receive the latch when moved to unlatching position.

Figure 1:
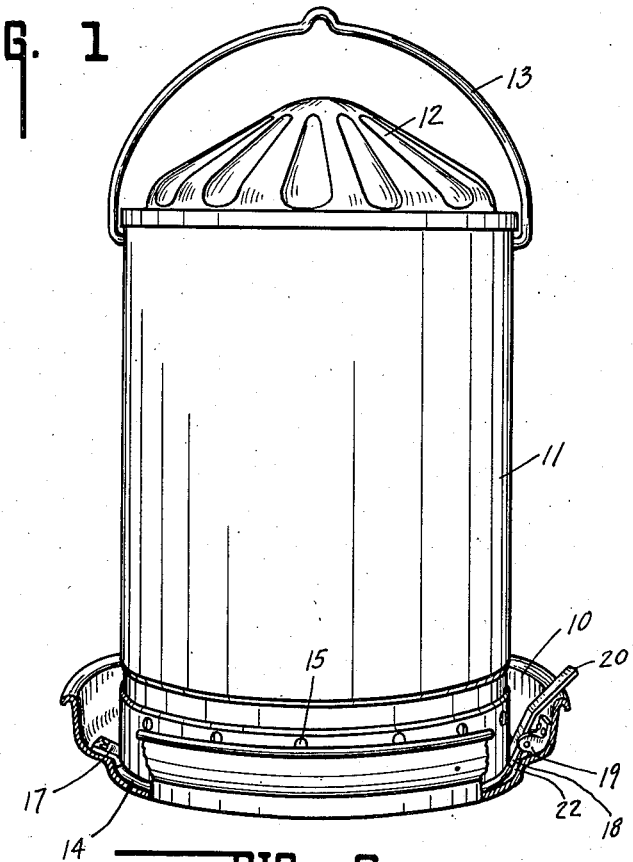
Figure 2:
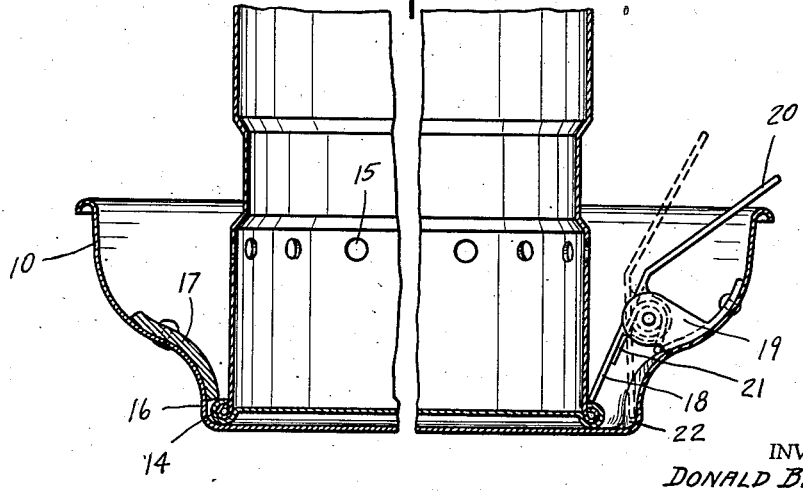

The full nature of the invention will be understood from the accompanying drawing and the following description and claims:

Fig. 1 is a perspective view of the pan with the tank latched thereto and with portions of the pan shown in section. Fig. 2 is an enlarged vertical section through the tank and pan with parts broken away and showing the latch in elevation, and wherein said latch is shown in its latching position by full lines and in its unlatching position by dotted lines.

In the drawing there is shown for purposes of illustrating the invention a constant level water receiving pan 10 and a reservoir or tank 11 attached thereto, said tank being provided with the top 12 with which a bail or handle 13 is connected. About the bottom edge of the tank there are provided the usual peripheral bead 14 and suitable openings or ports 15 at the desired water level to be maintained in the pan.

The pan 10 is of the usual depth, or relatively shallow as compared with the tank, to permit of ready access by fowls or the like to the water or liquid at the level maintained therein and is flared outwardly so that the upper portion of the wall thereof is spaced a substantial distance from and about the wall of the tank. The bottom of the pan is formed with an annular shoulder 16 within which the bottom of the tank or the bead 14 is adapted to seat for positioning and centering the tank relative to the pan and maintaining their relative positions when the tank is seated therein.

Secured to the inner wall of the pan in association with said shoulder 16 there is provided an inwardly extending lug adapted to engage the upper surface of the bead 14 when positioned thereunder by a slight sliding movement by the tank in the direction of the lug when seated within the annular shoulder 16. In this connection, it is to be noted that the relation of the shoulder and the bead is such as to permit such slight movement sufficient to engage and disengage the bead from under the lug 17.

Oppositely disposed to said lug or on the other side of the inner surface of the pan there is provided a latch 18 pivotally mounted to move forward to latching engagement with the bead 14. Said latch is pivotally mounted intermediate its ends between a pair of ears 19 secured to the inner wall of the pan in respect to which it is manually actuated by an upwardly extending handle 20 normally maintained in forward position under tension of the spring 21. By means of this arrangement the lower end of the latch is adapted under spring pressure to swing over the bead 14 into engagement with the side wall of the tank, as shown in full lines in Fig. 2, to thereby interlock the pan with the tank in association with the afore-mentioned lug. Thus, the pan is latched to the tank so that in their united relation they may be moved from one position to another by the bail 13 or hung from an overhead support.

Immediately below the pivotal mounting of the latch, the pan is provided with a recess 22 directly above the shoulder 16 into which the latch 18 may be free to swing to unlatched position against the tension of the spring 21, as shown by dotted lines in Fig. 2. This movement of the latch being manually accomplished by engagement of the handle 20, forcing it inwardly against the spring pressure, both releases the bead 14 and permits its sliding movement from under the lug 17, whereupon the tank and the pan may be separated.

Therefore, it will be noted from the above description that the pan structure comprises a receiving and centering well defined by the shoulder 16 and which conforms to the bottom of the tank 11 and the bead 14 extending thereabout. Thus, when the bottom of the tank is circular, as shown herein, the well will be correspondingly circular, whereas if the bottom of the tank is square or oval, the well would be correspondingly square or oval, the well conforming to the bottom of the tank for the purpose of effecting the centering and seating of the tank therein. However, as it will be noted, the well is slightly larger than the bottom of the tank so as to permit of sufficient play to permit of relative movement therebetween, the movement of the tank within the well being substantially to the extent of the width of the bead 14. Thus, when the tank is centered in the well a slight lateral movement will position the bead 14 under the lug 17 so that it may be latched by the pressure exerted against the tank by the spring pressed latching member 18, but upon release of the latching member a very slight lateral movement will free the bead from under the lug.

The invention claimed is:

1. In a structure of the character described, the combination with a tank having an outwardly extending projection on opposite sides adjacent the bottom thereof, of a pan adapted to be latched to the bottom of said tank, a retaining lug extending inwardly from one side of said pan under which said projection is adapted to be engaged, a recess formed in said pan on the side thereof opposite said lug, and a releasable latch secured to the inner surface of said pan over said recess and movable into latching engagement with the projection on said tank for securing the pan thereto in association with said lug, said latch being movable from said latching engagement into said recess for permitting the projection on the tank to clear the latch for release from said lug.

2. In a structure of the character described, the combination with a tank having a peripheral bead adjacent the bottom thereof, of a pan adapted to be latched to the bottom of said tank, a receiving and centering well provided in said pan and conforming to the bottom of said tank which is centered and seated therein, said tank having sufficient play in said well to permit relative movement therebetween to substantially the extent of said bead, a retaining lug secured to the inner surface of said pan immediately above said well and so related to the bead on said tank that it may engage thereunder, a recess formed in the wall of said pan opposite to the location of said lug, and a spring actuated latch pivotally mounted intermediate its ends in said pan and in such relation to said recess and the bead of said tank that its lower end is movable into latching engagement with said bead when in one position and into said recess to free said bead when in another position.

3. In a structure of the character described, the combination with a tank having a peripheral bead formed thereabout, of a pan adapted to be removably secured to the bottom thereof having an upwardly flared peripheral wall, the lower portion of said wall being curved inwardly adjacent the bottom of the pan for forming a shoulder to define and provide a receiving and centering well for the bottom of said tank when placed therein and wherein the spaced relation between the bottom of said tank and said shoulder is such as to permit relative movement therebetween to substantially the extent of said bead, a retaining lug secured to the inner surface of said pan immediately above said well-defining shoulder under which the bead on said tank may be moved to and from interlocking enagement, and a spring actuated latch pivotally mounted intermediate its ends on the inner wall of said pan in opposed relation to said lug with its latching end extending downwardly into the well of the pan for latching engagement with said bead, said latch being provided with an opposed handle portion extending upwardly to adjacent the upper edge of said pan.

DONALD B. TOLLEY.